United States Patent [19]
Soejima

[11] Patent Number: 5,732,959
[45] Date of Patent: Mar. 31, 1998

[54] METHOD FOR POSITIONING BINDINGS TO BE FITTED AND DEVICE USING SAME

[76] Inventor: Noboru Soejima, 1-11-305, Takanawa 1-chome, Minato-ku, Tokyo 108, Japan

[21] Appl. No.: 507,227
[22] PCT Filed: Dec. 27, 1994
[86] PCT No.: PCT/JP94/02239
    § 371 Date: Aug. 18, 1995
    § 102(e) Date: Aug. 18, 1995
[87] PCT Pub. No.: WO95/17931
    PCT Pub. Date: Jul. 6, 1995

[30] Foreign Application Priority Data

Dec. 29, 1993  [JP]  Japan ................. 5-352600

[51] Int. Cl.$^6$ .................................. A63C 9/081
[52] U.S. Cl. ............... 280/14.2; 280/618; 280/607
[58] Field of Search .................. 482/51, 71, 909; 280/14.2, 607, 618, 613, 620, 633

[56] References Cited

U.S. PATENT DOCUMENTS 4,652,007  3/1987  Dennis ........................... 280/618
4,964,649  10/1990  Chamberlin ..................... 280/14.2

FOREIGN PATENT DOCUMENTS 2654034  10/1990  France ........................... 280/14.2
2651143   3/1991  France ........................... 280/14.2

Primary Examiner—Brian L. Johnson
Assistant Examiner—Avraham Lerner
Attorney, Agent, or Firm—Varndell Legal Group

[57] ABSTRACT

A method and a device for positioning boot bindings to be fitted depending on an axial deviation of a body of a snow board player in which a pair of fore and back loading disks (21) and (21') are arranged rotatably on a base (11) and each of the loading disks (21) and (21') can be fixed to a turning direction at an arbitrary angle. A player stands with his boots on the fore and back loading disks (21) and (21'). One of the loading disk (21) or (21') is temporarily fixed at a predetermined position to detect the axial deviation of the body by twisting an ankle right and left, while the axial deviation of the body on the other loading disk (21) or (21') is detected by a similar operation, thereby fixing fore and back boots on the snow board so as to provide an angular difference corresponding to an angular deviation ratio of both angles thus determined.

5 Claims, 4 Drawing Sheets

METHOD FOR POSITIONING BINDINGS TO BE FITTED AND DEVICE USING SAME

BACKGROUND OF THE INVENTION

1. Field of the Invention

The present invention relates to a method for adjusting the position of bindings and to a device that enables adjusting the position of the bindings for fixing a player's boots on a snow board.

2. Prior Art

The positions where bindings are fixed to a snow board can vary based on the various kinds of soft or hard boots, including not only an all-round model but a free style or an Alpine model. In the past, the bindings have been conventionally arranged by a snow board instructor or shop assistant according to an instruction or an experience of such a staff. A snow board player stands with his boots on the snow board to determine a a stance, and the bindings for the boots are fixed on the snow board only from the player's body build and personal preference without any theoretical basis.

In a conventional positioning method of bindings as described above, the boots are fixed at positions where the player feels comfortable. The positions thus arranged seem to result in the most pleasant snow boarding, but such positioning is only a self-contentment of the player and makes the player tired unconsciously and retards an improvement in snow boarding technique.

It is an object of the present invention to provide a method for positioning bindings to be fixed on a snow board and a device for accomplishing the same in which an axial deviation of a player's body is calculated to fix the bindings at adequate positions on a snow board.

SUMMARY OF THE INVENTION

According to the present invention, there is provided a method for positioning a pair of bindings on a snow board which comprises the steps of detecting an angular deviation of snow board player's legs from right and left directions, calculating the angular deviation ratio between the detected right and left directions, and subsequently fixing a binding arranged at a fore position to a longer direction of the snow board so as to deviate the binding at an arbitrary angle from a long directional center of the snow board, and then fixing another binding arranged at a back position of the snow board so as to deviate the binding at an angle corresponding to the angular deviation ratio from the fore one.

Further, there is provided a device for fitting a pair of bindings on a snow board which comprises a pair of fixing means and on a base bearing center marks arranged along a length of the snow board, includes a pair of a fore and back loading disks for adjusting the angle of the bindings relative to one another.

DETAILED DESCRIPTION AND THE PREFFERED EMBODIMENTS

Figure 1:
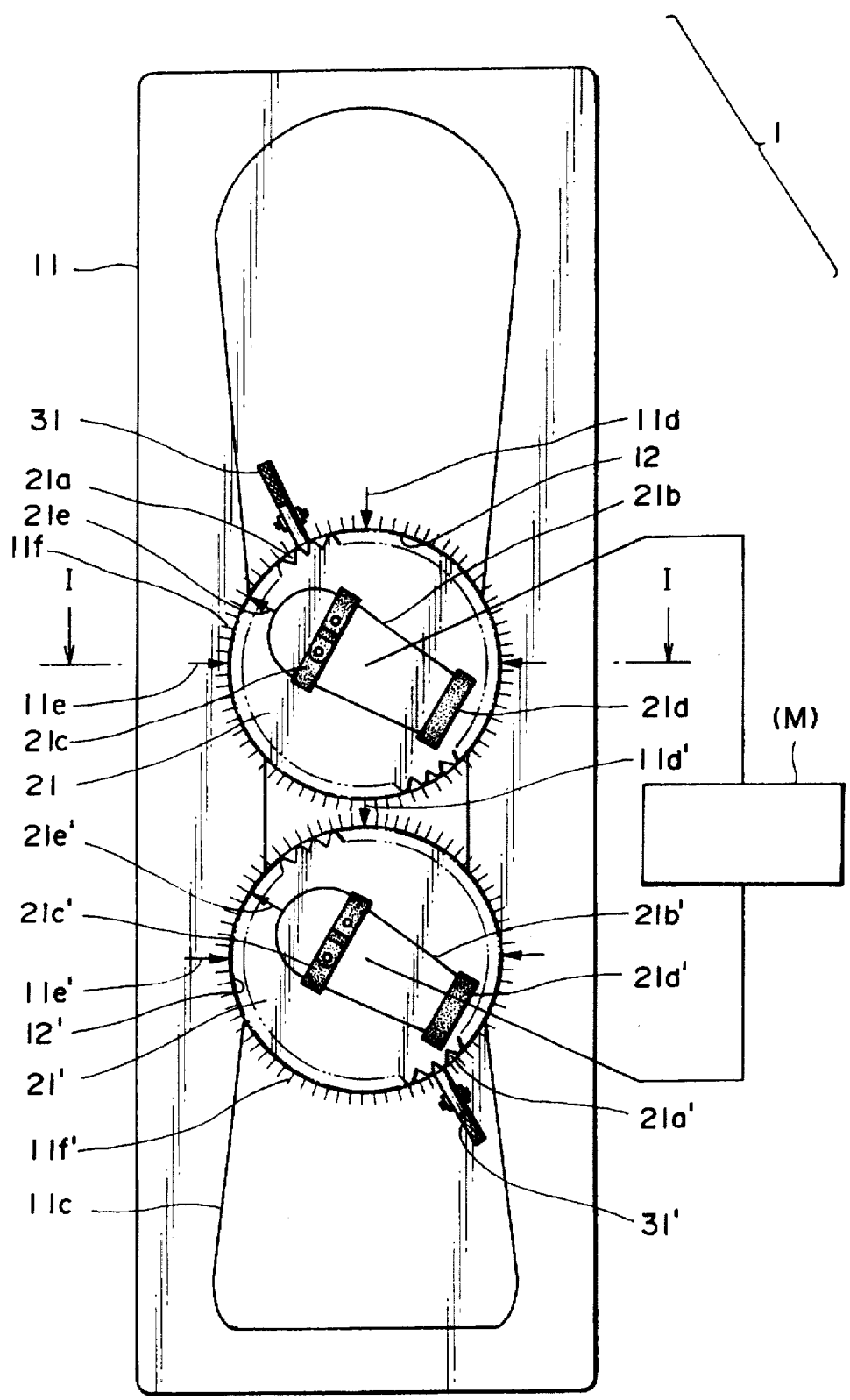
FIG. 1 is a plane view of a device according to the present invention.

Characteristic features of the present invention are as follows:

1. The location or angles of bindings can be adjusted on the snow board depending on the axial deviation of the player's body. With better adjustment the snow board player can improve his snow board technique without risking injury.

2. Because of the simple structure in which the rotatable fore and back loading disks are arranged on the base of the snow board and by providing the disks with displaying marks, the present positioning device is very compact and easy to transport without any trouble.

The operation of the present device will be described in the following. A pair of boots for a snow board player are fastened to the fore and back loading disks on the base of the snow board. While keeping one of the loading disk immovable, the other disk is turned by twisting an ankle to detect an axial deviation of a free leg. Then, with respect to the other loading disk, the same procedure is repeated to detect the axial deviation of the other free leg. An axial deviation ratio is obtainable from the detected data. After a fixing position of a fore boot is settled at a front part of the snow board, the back boot is positioned and then fixed in place, so as to deviate a fixing position thereof at an angle corresponding to the axial deviation ratio.

Referring now to a positioning device 1 for bindings to be fitted as shown in the drawings, an embodiment of the present invention will be described in the following.

Figure 2:
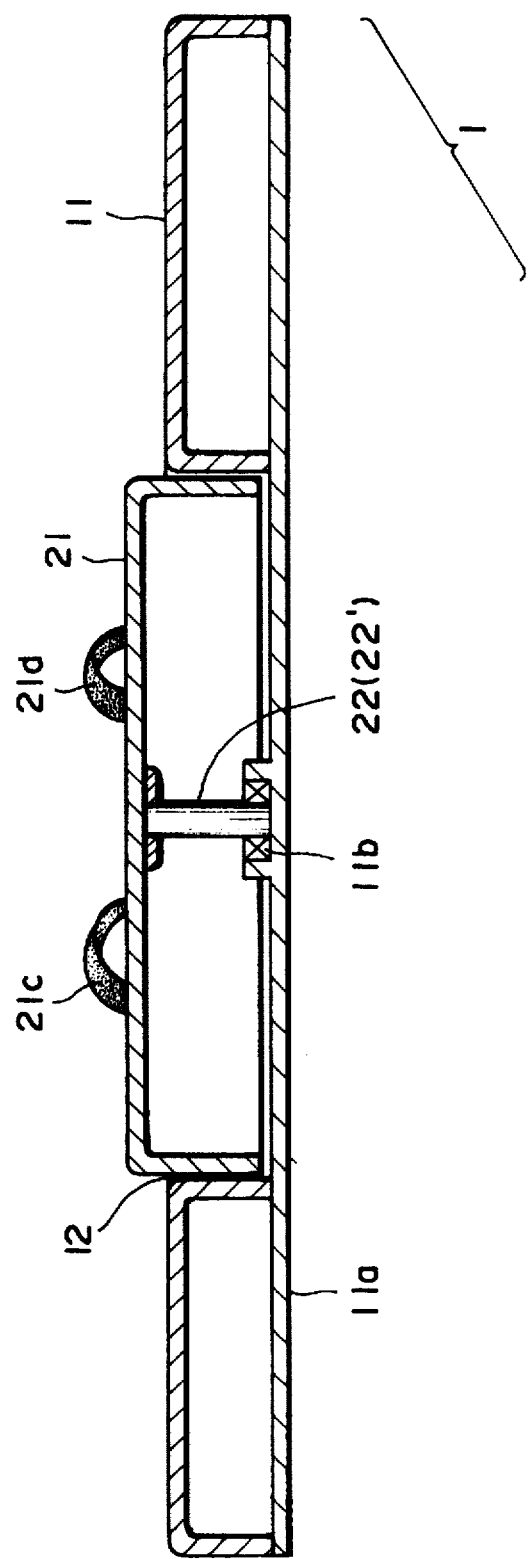
FIG. 2 is a section taken on line I—I in FIG. 1.

As shown in FIGS. 1 and 2, a positioning device 1 comprises a pair of a fore and back loading disks 21 and 21' fitted in circular fore and back openings 12 and 12' that are arranged at a central portion of a rectangular base 11 based on a plane view thereof. Lower ends of central axes 22 and 22' of the disks 21 and 21' are rotatably supported on a bottom frame 11a of the base 11 by means of bearings 11b, thereby the fore and back loading disks 21 and 21' can be turned or rotated arbitrarily on the base 11.

Figure 4:
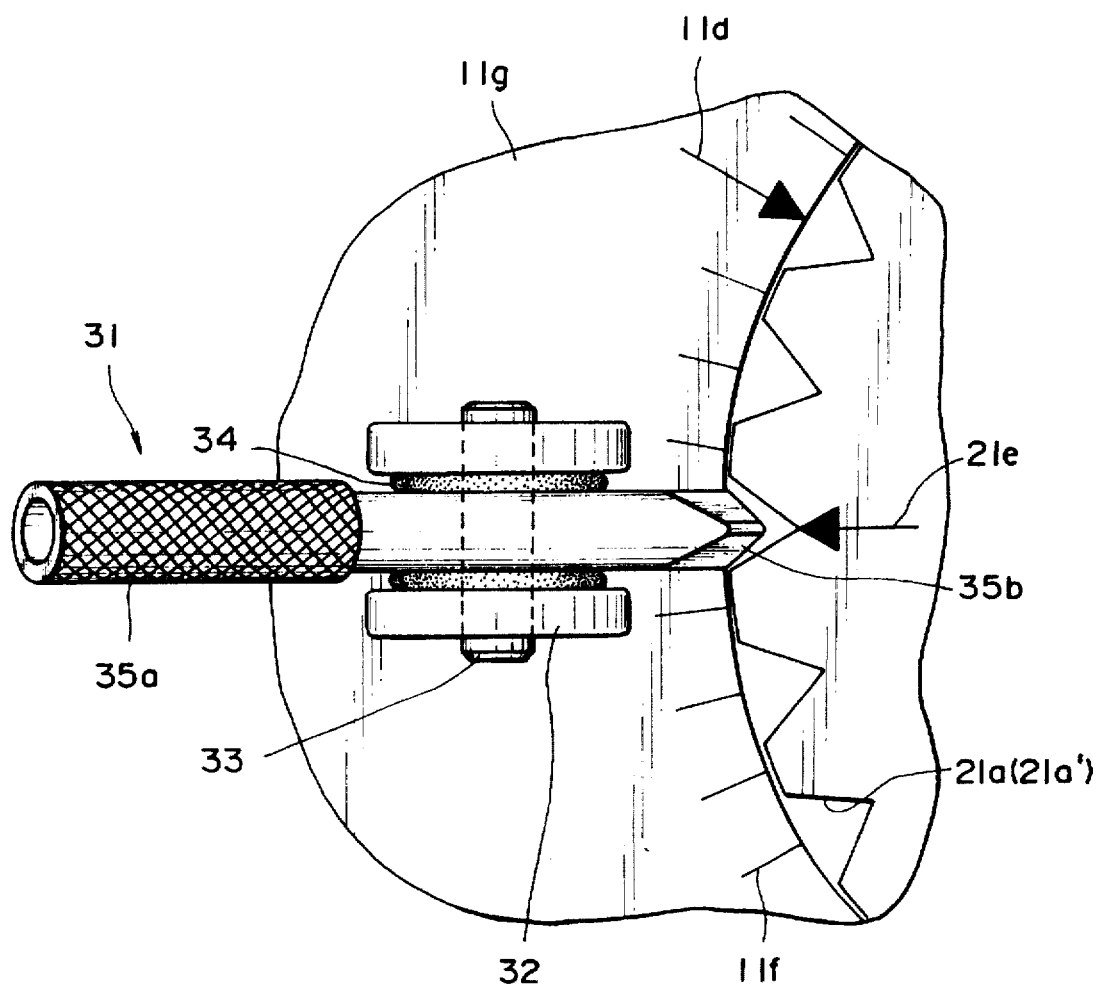
FIG. 4 is a plane view of a fixing means.

A number of stop notches 21a and 21a' are formed on each periphery of the disks 21 and 21', which are also shown in detail in FIG. 4. Boot marks 21b and 21b' are arranged on the center of the disks 21 and 21', which are provided with boots fastening belts 21c, 21c', 21d and 21d' including a length adjustable type, a "Magic Fastener" (registered trademark) type, etc.

There are arranged head marks 21e and 21e' at top ends of the boot marks 21b and 21b' so as to indicate deviated directions of the fore and back disks 21 and 21'.

Further, there is arranged a snow board line 11c on a surface of the base 11, which displays an outline of the board and includes the fore and back disks 21 and 21' in the center.

In the center of a longer direction of the line 11c, center marks 11d and 11d' are arranged, from which 40 graduations 11f are given on each inner periphery of both circular openings 12 and 12' at an angular interval of 9°.

Figure 3:
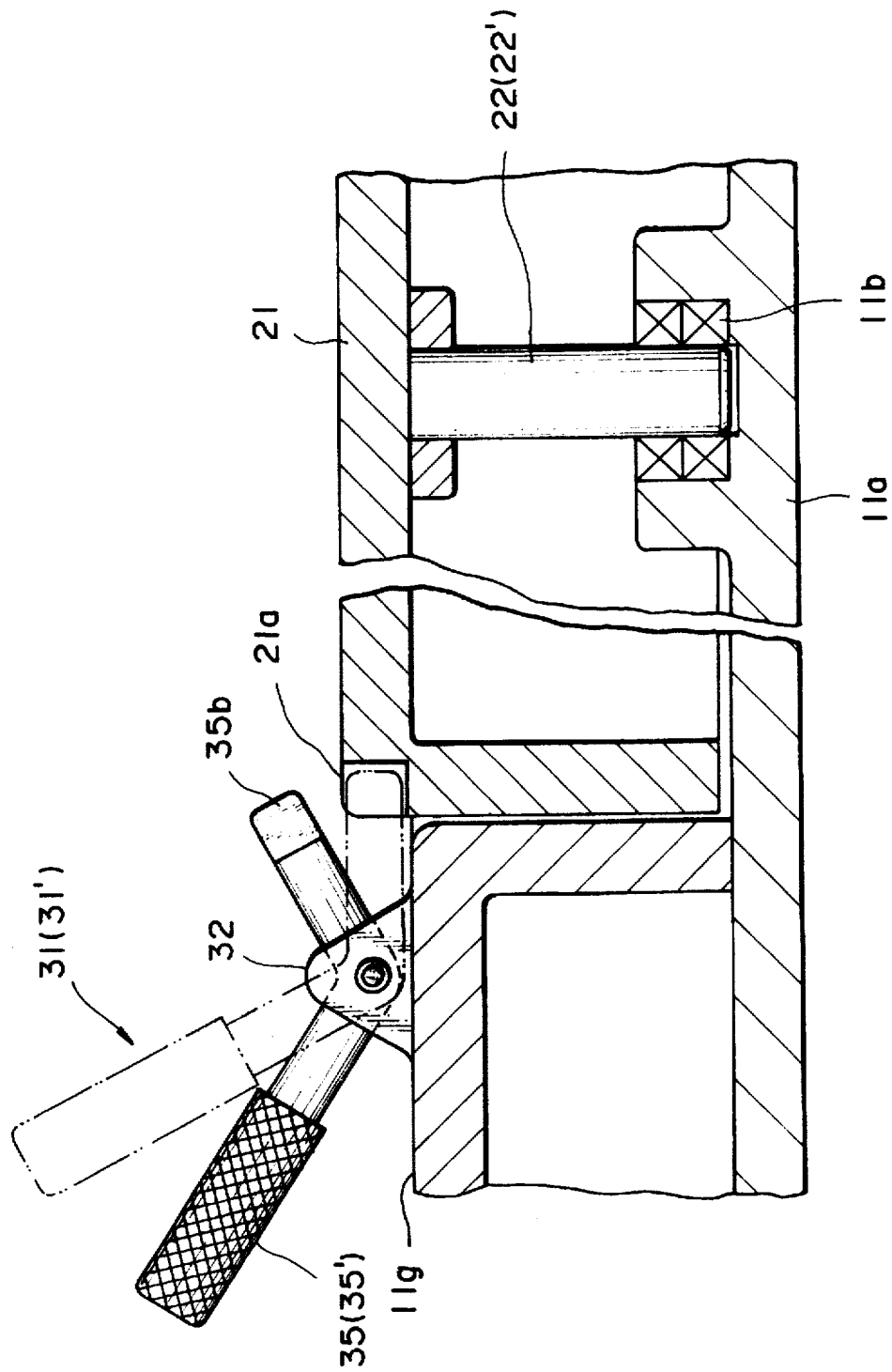
FIG. 3 is a fragmentary sectional side view of a main portion of FIG. 1.

Fixing means 31 and 31' are arranged on the base 11 to restrict turning of the fore and back loading disks 21 and 21' as shown in FIGS. 3 and 4 as enlarged views.

The fixing means 31 and 31' have common structure in which a L-shaped fixing body 35 or 35' is fitted pivotally on a hinge shaft 33 through elastic rings 34 thereby only forcedly pivoting the body 35 or 35', the elastic rings 34 being caught between bearing frames 32 mounted on a top frame 11g of the base 11. By pushing up and down a handle 35a, a tapered catch 35b formed on an other end thereof is caught by and released from stop notches 21a and 21a' of the fore and back loading disks 21 and 21', respectively.

A positioning method of bindings by use of the present positioning device 1 will be described in the following.

As to a mode how a player stands on a snow board, many stances are popular and known such as a sideway stance in which a player stands sideways on the board, a regular stance, a goofy stance and the like. However, for the sake of convenience, the present positioning method will be explained for the sideway stance.

1. A procedure to decide a player's front direction (right forward position)

In order to prevent the player from turning over, the fixing bodies 35 and 35' of the fixing means 31 and 31' are moved in advance from a full lined position to a virtual broken lined position in FIG. 3 so as to restrict turning of the fore and back loading disks 21 and 21'.

In this situation, the snow board player having his boots on is allowed to stand on the boot marks 21b and 21b' of the fore and back loading disks and 21' and his boots are fastened to the snow board by means of fastening belts 21c, 21c', 21d and 21d' as a preparatory step.

The catch 35b is once released from the stop notch 21a by operating the fixing body 35 of the fixing means 31 to allow the fore loading disk 21 free (releasing operation). Then, while coinciding the head mark 21e in position with the center mark 11d, the catch 35b is again caught by the stop notch 21a to restrict the fore loading disk 21 by operating the fixing body 35 of the fixing means 31 (fixing operation).

With respect to the back loading disk 21', the head mark 21e' is deviated from the center mark 11d to a counter-clockwise direction at about 30° to fix the the disk 21', by again pushing on and off the fixing means 31'.

In this situation, the player's body is twisted around a backbone thereof to a clockwise direction as far as possible without bending his knees, thereby detecting the front direction (right-forward position) of the body.

The body is then returned back to the initial position, while the boots are moved from the fore and back loading disks 21 and 21' and the direction of the body relative to the snow board is changed, so as to turn toward the opposite side of the center mark 11d. The boots as well as the fore and back loading disks 21 and 21' are fixed by the similar operation as described above to twist the body to a counter-clockwise direction, this time, thereby detecting the front direction (left-forward position) of the body.

It is also possible to detect a turning around angle of the player to the right-left direction from the front position based on the center mark 11d by simply detecting, for example, a direction of the player's eyes. Accordingly, a difference in such angles can be easily obtained.

As a result of these operations, the side of the body that twisted much further from the front is determined or, in other words, the side of the body that is easily twisted is determined as the more suitable direction to which the player's body should be turned from the front position of the snow board. Thus, the front of the player's body relative to a skiing direction of the snow board can be easily determined.

2. A procedure to decide a fitting angle of bindings

According to the procedure described above, there will be described below a case where the player's body desirably turns leftward relative to a skiing direction of the snow board as shown in FIG. 1.

First of all, according to the fixing operation described above, the fore and back loading disks 21 and 21' are fixed at positions where side marks 11e and 11e' coincide in positions with the head marks 21e and 21e', respectively, by operating the fixing means 31 and 31'.

Then, according to the releasing operation described above, only the fore loading disk 21 is released from a fixed condition to allow a right ankle (foot) to twist right and left, thereby detecting an axial deviation of the body determined by a reading of the graduations 11f as width of a turning angle of the right leg to the side mark 11e. The snow board player to be tested should keep both knees straight without bending. Here, it is assumed that the deviation is about 18° to the right-left direction for the purpose of convenience.

According to the fixing operation described above, the fore loading disk 21 is fixed at a position where the side mark 11e is coincident with the head mark 21e, while only the back loading disk 21' is released by the releasing operation to detect an axial deviation of the body relating to a left leg (foot) in a similar manner as described above. Here again, it is assumed that the deviation thus obtained is about 9°.

Then, the angular deviations are about 18° and about 9°, a ratio thereof being easily calculated as 18:9, or 2:1.

In the next step, the fore loading disk 21 is released by the similar releasing operation and then fixed again by the similar fixing operation at an angular position of the player's preference, for example, at a position of 36° to the center mark 11d.

Further, the back loading disk 21' is similarly released by the releasing operation to decide an angular position thereof. The turning direction of the back loading disk 21' is equal to half the angle of the fore loading disk, i.e., about 18°, because the ratio is 2:1 as described above.

In this situation, the back loading disk 21' is fixed similarly by the fixing operation, and thus the turning angles of both loading disks are consistent with the fitting angles of the bindings.

Accordingly, fitting positions of the bindings of this player are 36° and 18° to the center mark 11d for the right and left boots, respectively. As described above, the bindings can be fitted at adequate positions suitable for each player's body.

Although it is empirically known that the distance between both bindings is about 40 cm and nearly equals to standard players' breadth of shoulders, such a distance can be changed if desired.

Further, it is possible to detect and monitor the turning angles of the fore and back loading disks 21 and 21' by means of a potentiometer (not shown) and a monitor (M) as shown virtually by a broken line in FIG. 1, respectively. A similar result can be obtained by detecting the axial deviation of the body to decide the angular positions of the fore and back loading disks 21 and 21' to the center marks.

While an embodiment of the present invention has been described with respect to the sideway stance, it should be understood that a theoretical procedure to detect the axial deviation of the body thereby deciding the position of the boots exactly is common to the regular stance, etc.

What is claimed is:

1. A method for positioning a pair of bindings on a snow board which comprises:

determining a snow board player's right-forward position by fixing a snow board players boots to the snow board, having the snow board player turn to his right as far as possible without bending his knees, and measuring a resulting right-forward position, determining the snow board player's left-forward position by fixing the snow board players boots to the snow board, having the snow board player turn to his left as far as possible without bending his knees, and measuring a resulting left-forward position, calculating an angular deviation ratio based on the right-forward position and the left-forward position, fixing a binding arranged at a fore position on the snow board at an arbitrary angle relative to a longitudinal direction of the snow board passing through a center of the snow board, and fixing another binding arranged at a back position of the snow board so as to deviate an angle from the longitudinal direction equal to the arbitrary angle multiplied by the angular deviation ratio.

2. The method of claim 1, wherein the angular deviation ratio is obtained by dividing the right-forward position by the left-forward position.

3. A method for positioning a pair of bindings on a snow board which comprises:

fixing a snow board player's boots to the snow board by front and rear bindings, releasing the front binding and permitting the snow board player's front foot to rotate freely and measuring an axial deviation between a rightmost and a leftmost rotated front binding position, locking the front binding and inhibiting rotation of the snow boards player's front foot on the snowboard, releasing the rear binding and permitting the snow board player's rear foot to rotate freely and measuring an axial deviation between a rightmost and a leftmost rotated rear binding position, calculating an angular deviation ratio based on the measured axial deviations of the front and rear bindings, fixing the front binding at an arbitrary angle relative to a longitudinal direction of the snow board passing through a center of the snow board, and fixing the rear bindings so as to deviate an angle from the longitudinal direction equal to the arbitrary angle multiplied by the angular deviation ratio.

4. The method of claim 3, wherein the angular deviation ratio is obtained by dividing the axial deviation for the front binding by the axial deviation of the rear binding.

5. A snow board comprising a disk with belts for securing a boot to the disk, and a fixing means for adjusting an angle of a bottom of the boot relative to a longitudinal direction of the snow board, the disk including a plurality of notches, the fixing means including a bearing frame attached to the snow board, an L-shaped body pivoted to the bearing frame by a hinged shaft, the L-shaped body having a tapered catch at one end thereof receivable in any of the plurality of notches, wherein the angle can be adjusted by rotating the L-shaped body to disengage from one of the plurality of notches, rotating the disk, and rotating the L-shaped body to engage another of the plurality of notches.

* * * * *